United States Patent [19]

Talbot

[11] Patent Number: 4,675,588

[45] Date of Patent: Jun. 23, 1987

[54] ELECTRICAL POWER CONTROL APPARATUS

[75] Inventor: Lionel E. Talbot, Ville de la Baie, Canada

[73] Assignee: Alcan International Limited, Montreal, Canada

[21] Appl. No.: 706,514

[22] Filed: Feb. 28, 1985

[30] Foreign Application Priority Data

Mar. 2, 1984 [GB] United Kingdom ................. 8405520

[51] Int. Cl.$^4$ ............................................. H02P 7/06
[52] U.S. Cl. ................................... 318/599; 318/341
[58] Field of Search ................. 318/341, 599; 363/72, 363/21; 323/285

[56] References Cited

U.S. PATENT DOCUMENTS 4,174,534  11/1979  Kotearewsky ........................ 363/26
4,278,930  7/1981  Rogers ................................ 323/285

OTHER PUBLICATIONS

Motorola Linear Integrated Circuits, MC 3420; MC 3520; Switchmode Regulator Control Circuit, 1979.

Primary Examiner—William M. Shoop, Jr.
Assistant Examiner—Saul M. Bergmann
Attorney, Agent, or Firm—Cooper, Dunham, Griffin & Moran

[57]  ABSTRACT

An electrical power control apparatus in which power to a load is shared between a plurality of power semiconductors, only one of which is shown. Each power semiconductor forms part of a separate servo loop comprising, in its simplest form, a current sensor whose output signal modulates the output pulse width of a signal generator. The output from the signal generator is used to control the conduction times of the power semiconductor via drive circuit. Although it is possible, indeed desirable, to synchronise operation of the signal generators of the different servo loops, the loops are completely independent of one another, and the instantaneous pulse width of the drive pulses in any one servo loop is controlled only by the characteristics of that loop.

10 Claims, 9 Drawing Figures

ELECTRICAL POWER CONTROL APPARATUS

This invention relates to electrical power control apparatus, in particular for controlling the power supplied to high power-consuming electrical equipment such as electric welding sets, or rotative electrical machinery used in electric locomotives, cranes, fans and blowers and battery driven vehicles.

Controllers for high electrical power have traditionally relied on linear control using resistance elements to determine the supplied power. More recently the technique known as "switched mode control" has come into use. In this technique, the magnitude of the average current supplied to the apparatus is determined by the relative proportions of the "on" and "off" times within the cycle.

Block diagrams of a number of prior art switched mode control systems are shown in FIGS. 1 to 4 of the accompanying drawings to which reference will now be made.

In the arrangement shown in FIG. 1, current is supplied to a load 5 via a power transistor 4 from a power source (not shown), which may be a mains-powered source or a battery. Current from the power source flows down an input line 8 to the collector of the transistor. The state of conduction of the transistor is controlled by a control circuit 1 connected to the base of transistor 4 via a drive circuit 3. This latter acts to amplify the output signal from the controller 1 to a level suitable to drive the base of the transistor. The control effected by the circuit 1 may be linear or switched (on-off). The error signal is generated on line 9 at the output of a summing network 2. Signals representative of the voltage applied to the load, and the current supplied to the load are inputted to the summing network on lines 10 and 11 respectively. A control signal applied to the summing network on line 7 may be used to set the output voltage in a constant voltage system or to set the output current in a constant current system. Resistor R1 acts to generate a voltage on line 11 indicative of the load current.

The circuit of FIG. 1 functions as a servo system to make corrective changes to the input of the transistor 4. Clearly, the load currents have to be maintained within the power capability of the single output transistor. This level, at the present state of the art, is limited to continuous currents of approximately 100 amperes. At these limits of operation, the power output transistor is generally operated in the switched (saturated) mode of operation and only at somewhat lower currents can the linear (unsaturated) mode be used.

In order to increase the available output current, two or more transistors can be connected in parallel, and this arrangement is shown in FIG. 2. This circuit differs from that of FIG. 1 only in that a plurality of paralleled output transistors 4a, b, c, . . . 4n are used. In this arrangement, all of the collector electrodes are commoned, likewise all of the base and emitter electrodes are commoned. Control to the commoned base is thus effected from a single drive circuit 3 or, at least, from a single controller 1. The base drive current to the parallel transistors has to be increased to a level sufficient to obtain the total desired output current. Currently, various methods used alone or combined are employed in order to obtain the required high currents and this, with a certain degree of reliability. These methods include:

1. Use of perfectly matched output transistors in an arrangement such as that shown in FIG. 2;
2. Use of base drive equalisation circuits, such as shown in FIG. 3;
3. Use of collector-emitter and base current equalisation circuits, such as shown in FIG. 4.

It is possible to purchase matched sets of transistors, these initially being selected according to the customer's requirements at a cost upwards of 20 to 30 times the cost of a single non-matched transistor. There exists the possibility that these characteristics will not remain matched throughout the life of the transistors since, as aging occurs, their characteristics change differently for individual transistors. Eventually, the characteristics differ sufficiently to result in dramatic failure of a particular circuit. The majority of these failures are attributable to the unequal distribution of currents through the parallel output transistors which, in turn, is due to the unequal conduction characteristics of the paralleled transistors. Upon such failure, all transistors have to be replaced by a complete new set of matched transistors.

In FIG. 3, base resistors have been inserted between the output of the drive circuit 3 and the bases of the paralleled output transistors. Under normal conditions, with matched transistor characteristics, the base currents of all the output transistors are equal. As the transistors heat up, the individual internal base resistance of each transistor has a tendency to decrease, often by a different amount to its neighbour, and then the base currents become unequal. If an external base resistor of, for example, ten times the value of the internal base-emitter resistance of the associated output transistor is inserted in the base lead of each output transistor then the change in internal base resistance becomes insignificant. Therefore, provided that the output transistor characteristics remain constant, and the base drives remain equal, the output current will be equally distributed amongst the individual output transistors. In practice, this is not the case.

The circuit of FIG. 4 attempts to improve on the FIG. 3 circuit by the addition of emitter resistors RE1, RE2 . . . REN in the emitter circuits of the respective power transistors. These resistors, when of proper value, tend to equalise both the base current and the collector-emitter current of the individual output transistors. Thus, this method, either alone or in combination with that shown in FIG. 3, is much preferred. The current flowing in resistors RE1 . . . REN causes a voltage drop in RE1 . . . REN which tends to elevate the emitter voltage at the junction of the transistor emitter and its respective resistor RE1 . . . REN. This reduces the base current drive in the transistors. If any one transistor conducts current more heavily than its neighbours, then the voltage appearing at the emitter of the particular transistor is higher and a still lower base current drive is allowed. The output current will therefore be reduced. Although an improvement on earlier circuits, the life expectancy of such a circuit is still to a large extent dependent upon the characteristics of the different transistors remaining approximately the same over their lifetime. The circuits described above therefore only offer a temporary solution to the problem, by delaying the onset of the effects of any changes in transistor characteristics.

British patent specification No. 2070295 describes a system for regulating the power supplied to a load and which comprises a plurality of power transistors which share the current to be supplied to a load. Two closed-loop feedback systems are provided: a first to match the transistors in such a way that they maintain the same collector-emitter saturation voltage when conducting and a second to ensure simultaneous switching of the transistors from one steady state to the other. Regulation is achieved by a base drive oscillator which is common to all the transistors and whose output signal is pulse width modulated in proportion to the load current. Regulation is effected on all the transistors simultaneously on the basis of an error signal derived from the total load current. The two closed loop systems simply act to equalise the operating characteristics—switching times and through current—as between the individual transistors, thus making sure that no one transistor takes a greater proportion of the load than another.

German patent specification No. 2629412 describes a system for regulating the power supplied to a load and comprises two transistors which share the current to be supplied to the load. Each transistor is enclosed in a separate servo loop and is pulse width modulated on the basis of an error signal derived from the current flow through the respective transistor. The pulses to be modulated are supplied by a common pulse generator, the output of which is connected directly to one servo loop and via an inverter to the other. The system is limited to just two power transistors and it is not easy to see how an extension beyond two would be possible. The device has thus only limited power handling capabilities.

In the present invention a plurality of independent servo loops are connected in parallel to supply regulated power to a load. This is achieved by separate and independent regulation of the power supplied by each power transistor.

In accordance with the invention there is provided electrical power control apparatus comprising a plurality of power semiconductors connected in such a way as to share the total current between a power source and a load, each of said power semiconductors being connected in a separate servo loop operable to separately control the current supplied by each transistor, each servo loop comprising means for generating a control signal indicative of the current supplied by its associated transistor, a pulse generator connected to receive said control signal and operable to generate a pulse width modulated drive signal whose mark/space ratio is dependent upon said control signal, said drive signal being used to control the power supplied by its respective transistor.

It will be seen that, in the present invention, each output semiconductor in an array of paralleled semiconductors is completely separately controlled by an individual servo loop. In other words, the control electrode of each semiconductor is connected to a separate drive circuit which in turn is connected to a separate controller. Means are provided for individually assessing the current of each output transistor and using this information to control the appropriate servo loop. Thus, each servo loop controls its own output current, and the sum of the individual loop output currents flows through the load. In an embodiment the total current is also sensed and used as a limiting parameter in controlling the individual semiconductors, as will be explained hereinafter.

It is further possible, indeed it may be advantageous, to synchronise the operations of the various pulse generators by synchronisation of, for example, the turn ON times of the drive signal pulses as between the pulse generators of the different servo loops; however this in no way reduces the essential independence of the individual loops each of whose drive signals are (limit conditions excepting) entirely controlled by the conditions pertaining within their respective loops.

The invention will be further explained by way of example only, with reference to FIGS. 5 to 9 in which.

Figure 1:
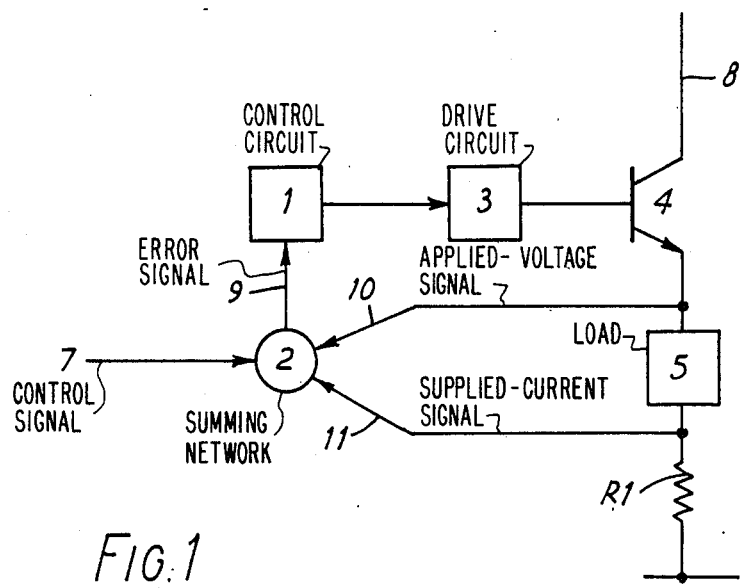
Figure 2:
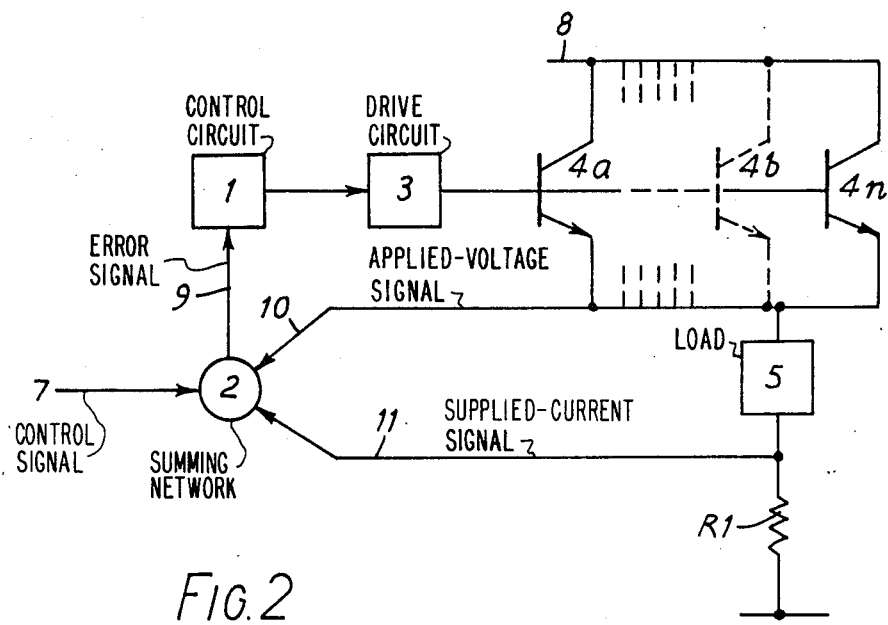
Figure 3:
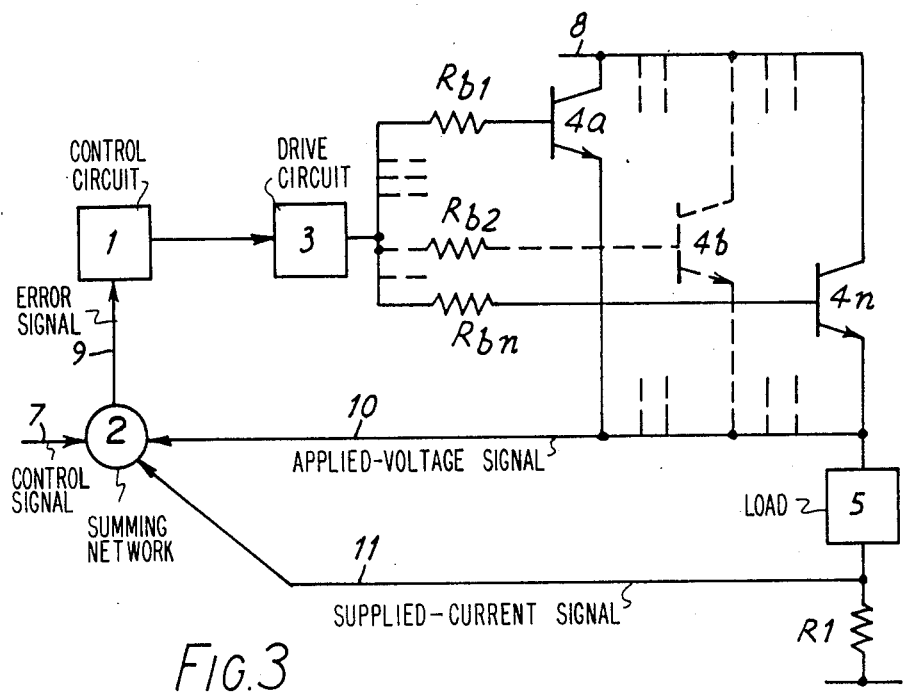
Figure 4:
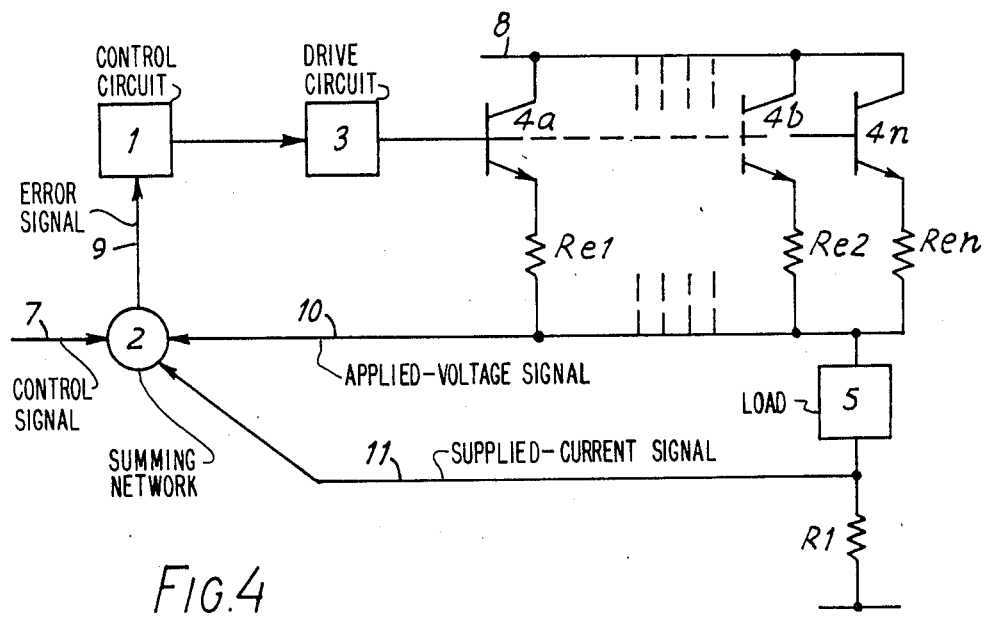

The reference numerals used in FIGS. 5 to 9 are the same as those used in the previous drawings, where applicable.

Figure 5:
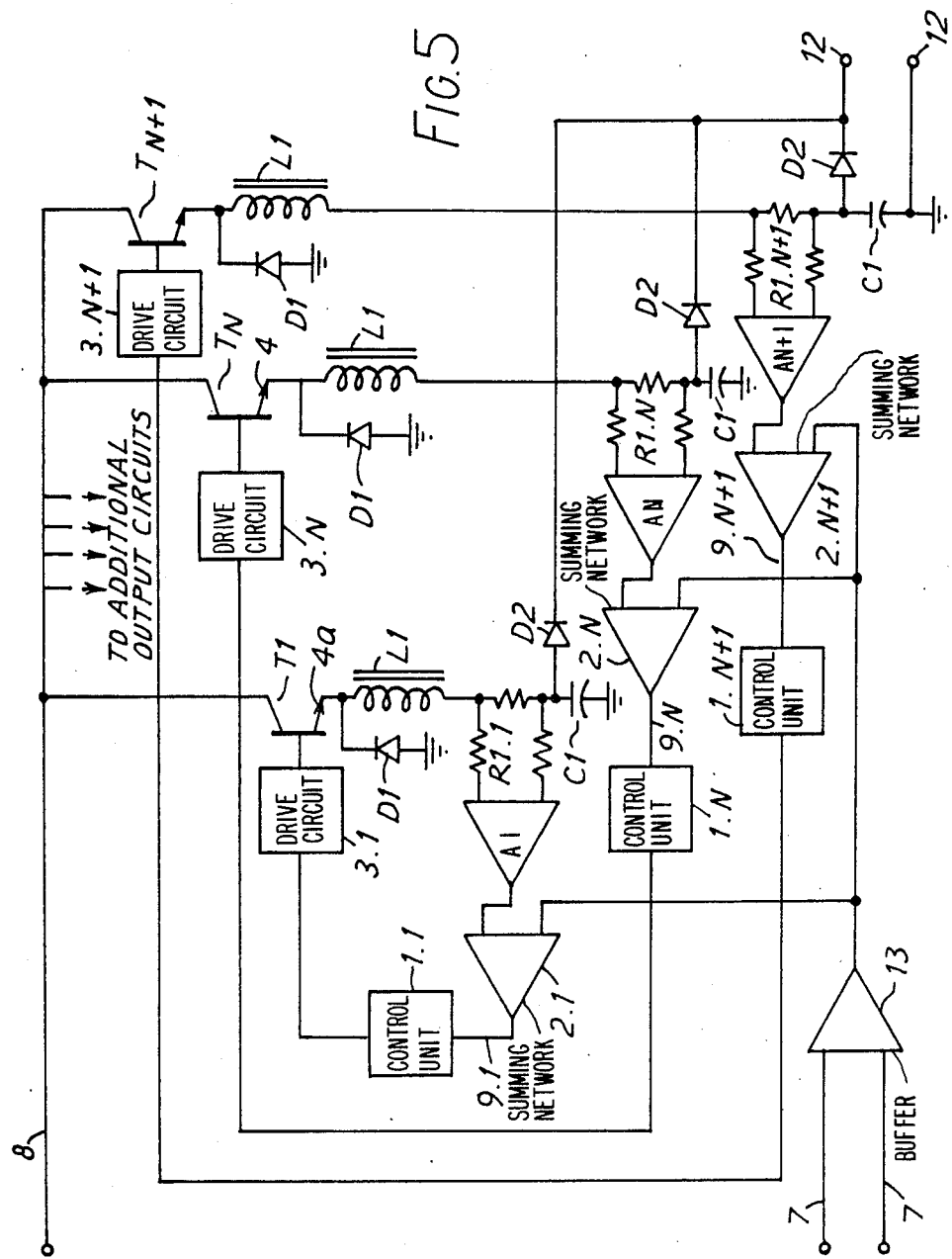
FIG. 5 is a block diagram showing a power control apparatus according to the invention.

As before, in FIG. 5 power from the power source (not shown) is supplied along line 8 and is shared between a plurality of power transistors T1, . . . TN, TN+1 whose collector electrodes are connected in common to the line 8. The emitter electrode of each transistor is connected to a respective filter network comprising a free-wheeling diode D1 connected to ground, and a choke coil L1. These two components, in conjunction with a respective capacitor C1 act as a filter in order to smooth the output voltage and current from the transistors in order to make them suitable as a stable DC power source. The filter network has to reduce the "on/off" step inputs to the filter caused by the switching of the transistor to a smooth up/down ramp of nearly constant amplitude flowing to the load, wherein the average voltage and/or current of such ramp has to be that required by the load at a particular instant. The operation of these filters is well described in appropriate literature, and will not be detailed further.

The output current from the emitter electrode of each transistor is thence passed through a respective current sensing resistor R1.1, . . . R1.N, R1.N+1 to a respective commutating diode D2 and thence to the load (not shown) via the output terminals 12.

A voltage proportional to the current supplied by each transistor is supplied to a respective amplifier A1, . . . AN, AN+1 to a respective summing network 2.1, . . . 2.N, 2.N+1 to thereby generate an error signal on respective line 9.1, . . . 9.N, 9.N+1. The summing networks also receive an input signal from a common buffer 13 which in turn receives control signals along lines 7, as previously.

Each error signal is passed to a respective control unit 1.1, . . . 1.N, 1.N+1 which is operable to generate a square-wave output signal whose mark/space ratio at any one instant of time is dependent upon the magnitude of the corresponding error signal. This pulsed output signal is passed to a final drive circuit 3.1, . . . 3.N, 3.N+1 where the signal is amplified to a level suitable for driving the corresponding output transistor.

The total load current is set by an appropriate signal on lines 7, but the manner in which the paralleled transistors share this current is automatically determined by the individual servo loops.

Figure 6:
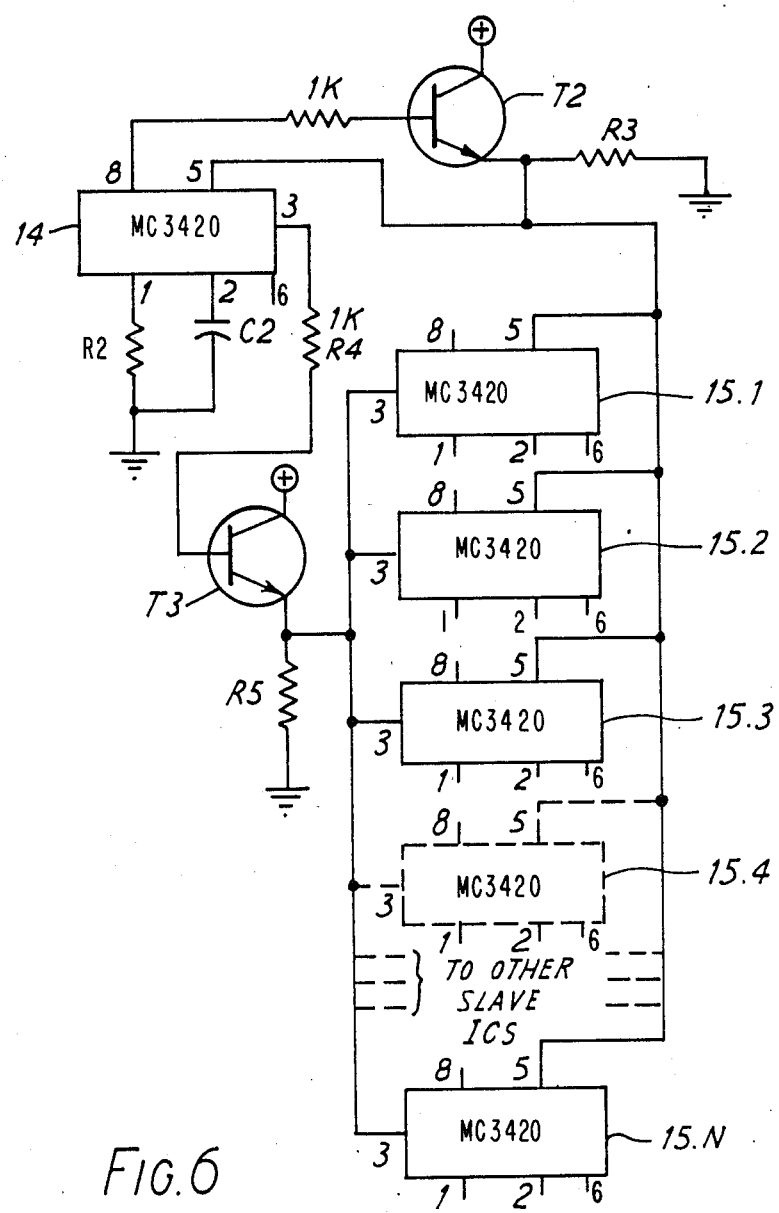
FIG. 6 is a block diagram to illustrate multiple slaving of the oscillator IC used in the apparatus of FIG. 7.
Figure 7:
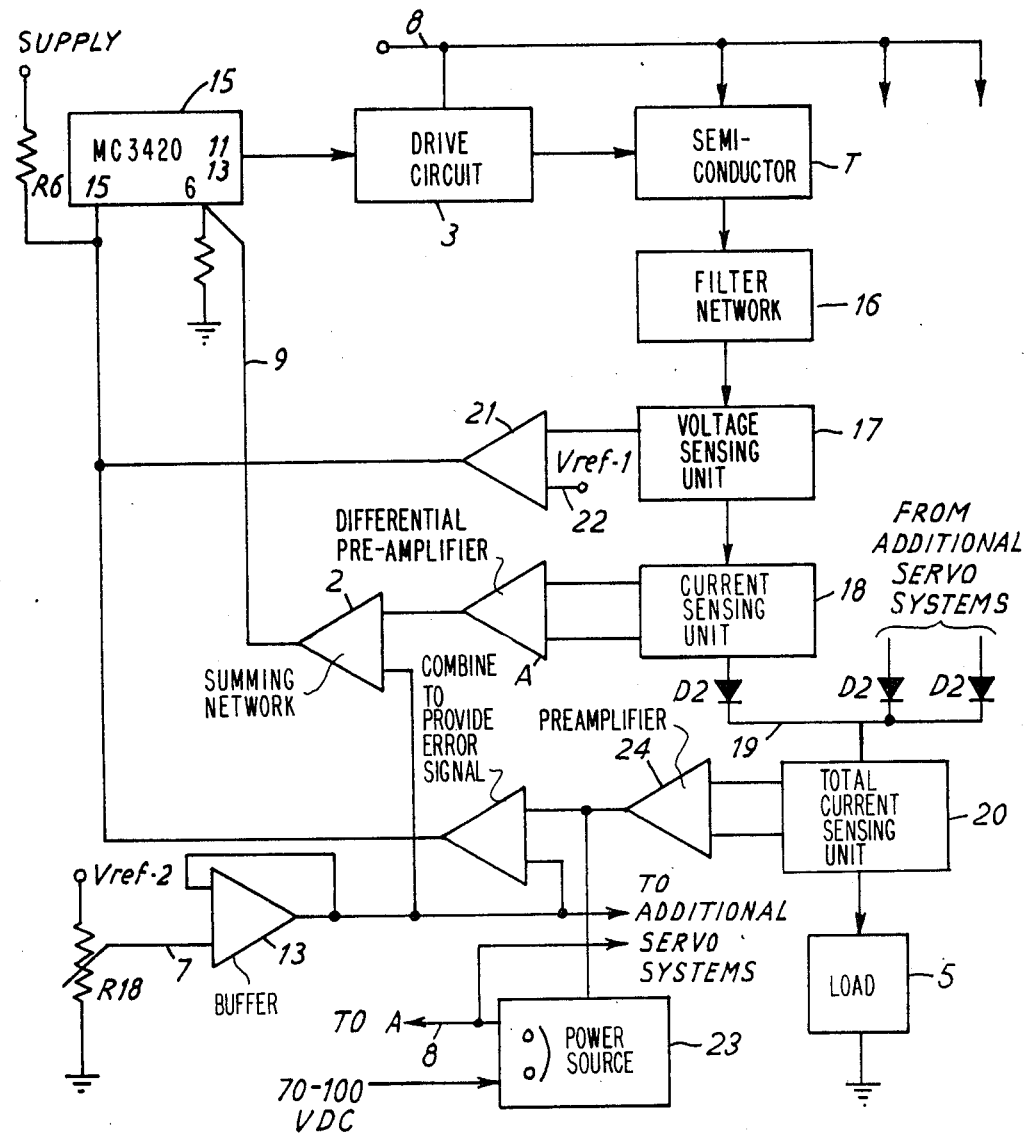
FIG. 7 is a block diagram illustrating a typical single servo loop.

FIGS. 6 and 7 show a more practicable embodiment of the invention, in block diagram form, using a commonly-available integrated circuit (IC), type MC3420 by Motorola.

The basis of the circuit of FIG. 6 is a common pulse generator in the form of a master IC 14 to which a number of slave IC's 15.1, 15.2, . . . 15.N are connected. The frequency of the internal local oscillator of the master IC is determined by a resistor R2 and capacitor C2 connected to pins 1 and 2 respectively and is set typically within the range of 10 kHz to 25 kHz. The corresponding pins of the slave IC's are left unconnected. The output from the master oscillator appears at pin 8 of the master IC and is connected via a 1 kohm resistor to the base of a transistor T2 which is connected in emitter-follower configuration. A load resistor R3 is connected between the emitter of transistor T2 and ground and the junction of this resistor and the emitter is connected to the oscillator input pin 5 of the master IC and each of the slave IC's. A second signal is available at pin 3 of the master IC and is connected to the base of a second emitter follower transistor T3 via a 1 kohm resistor R4. The purpose of resistors R3 and R4 is to eliminate the possibility of oscillation. A further resistor R5 is connected between the emitter electrode of transistor T3 and ground and the junction between resistor R5 and the emitter of transistor T3 is taken to pin 3 of each of the slave IC's. This second connection (to pin 3 of each of the slave IC's) is necessary due to the fact that this signal is normally driven internally from the oscillator circuit of each IC. In the case of the slave IC's, the internal oscillator is disabled by the absence of the frequency determining components at pins 1 and 2.

With the arrangement described with reference to FIG. 6, the master IC, and each of the slave IC's can be separately controlled by separate inputs to each pin 6. As can be seen in FIG. 7, the signal on pin 6 controls the pulse width of the output of the appropriate master or slave unit which appears on pins 11 and 13; the effect of the multiple master/slave arrangement is that the turn ON times of each of the semi-conductors T is synchronised, their turn OFF times being dependent on the instantaneous pulse width of the appropriate servo loop. Reference will now be made to FIG. 7 which shows how the multiple master/slave unit described with reference to FIG. 6 can be used in the multiple servo system of the present invention.

A single master or slave IC such as described above with reference to FIG. 6, is shown under reference 15. It is to be noted that FIG. 7 shows only a *single* servo loop, the remaining servo loops being identical, and each using one of the master or slave IC's shown in FIG. 6.

The basic similarity of the servo loop to that shown in FIG. 5 is immediately apparent. The output from the IC 15 is taken from pins 11 and 13 to the drive circuit 3 and thence to the semiconductor T. The semiconductor T is connected via a filter network 16, voltage sensing unit 17, current sensing unit 18 and a respective commutator diode to a common rail 19 and thence to a total current sensing unit 20 from which current is finally passed to the load 5.

The filter network 16 comprises diode D1, choke coil L1 and capacitor C1, as described above with reference to FIG. 5. The voltage sensing unit 17 supplies a signal indicative of the voltage applied to the load to the input of a comparator/amplifier 21 and thence to the inhibit pin 15 of the IC 15. Pin 15 of the IC is maintained at supply potential via a resistor R6 and remains in this condition until a low signal is applied to the pin, in which case all the functions of the IC are inhibited. The inhibit function is used to turn off the IC whenever the output voltage sensed by the voltage sensing unit 17 exceeds a predetermined value set by a reference voltage applied to terminal 22 which is inputted to the comparator/amplifier 21. The voltage sensing circuit is composed of a voltage divider network which divides down the voltage applied to the load and applies it to the upper input of the comparator/amplifier 21. Whenever the divided down voltage exceeds the reference voltage applied to terminal 22, the comparator output switches to a low level and pulls down the applied voltage at pin 15 thereby halting the operation of the servo loop.

It should be noted that there may be applications where it is necessary to control the pulse width of the output from the IC 15 on the basis of the error signal produced at the output of amplifier/comparator 21. In the particular application envisaged, however, (that of electric arc welding) a constant *current* system is required and the load voltage is thus allowed to fluctuate within certain limits in order to maintain a constant load current. The voltage sensing unit shown is operable to detect a maximum limit which is used to indicate an open circuit output condition.

The current sensing unit 18 is composed of a resistive current sensor R1, such as described previously with reference to FIG. 5. The voltage across this resistor is amplified by the differential preamplifier A and thence passed to the summing network 2, as described previously. The error signal on line 9 is thus indicative of the load current and controls the output pulse width of the IC 15 in accordance with this load current.

The purpose of the commutating diodes D2 is to provide a means of interconnecting the individual servo loops in order to obtain a total current which is the sum of the individual loop currents and at the same time to prevent one servo loop from interfering with the other loops. These diodes eliminate the need to instal perfectly matched components in each loop such that conduction in each loop would be identical to the other servo loops. Standard tolerance components can thus be installed, and the conduction time of one loop may be quite different from the next loop without interaction—for example, one output semi-conductor can be "ON" for 40% of the duty cycle whereas the next loop output conductor can be "ON" for 35% of the duty cycle in order to allow identical average current to flow. In these circumstances, no interference occurs.

The commoned cathodes of diodes D2 are connected to the total current sensing unit 20. The sensing unit itself is similar to current sensing unit 18, described above, and is included for safety reasons only. The current sensed at this point will be the sum of the individual servo loop currents and is amplified in a preamplifier 24 and thence combined with the load current adjustment signal from buffer 13 in order to provide an error signal which is applied to the aforesaid inhibit pin 15 of the IC 15.

If the total current setting exceeds the total combined current capacity of the servo loops then the system is turned off via inhibiting pin 15. If the overcurrent is caused by a defect in one servo loop (for example a shorted output semiconductor) then this measure will be ineffective and, to counter this, a second output of preamplifier 24 is taken to the power source 23 and is operable to disable the power source in the event of a fault overcurrent. The total current sensing circuitry is such that a first (lower) level of overcurrent will cause inhibition of the IC 15, thereby disabling the output devices. While a second (higher) level of overcurrent will cause the main power source to be disabled. This second level of overcurrent is only obtained if a fault condition has occurred.

Returning to the IC 15, it has already been mentioned that pins 11 and 13 are the pulse width modulated output pins of the IC. The output at pin 11 can be ON between 0% and 50% of the total duty cycle and the output at pin 13 can be ON between 50% and 100% of the duty cycle. The duty cycle is referred to the total cycle time of the master oscillator contained within the master IC. In certain applications, pins 11 and 13 can be used to drive the two phases of an appropriate transformer. If pins 11 and 13 are tied together, as they are in this particular embodiment, the output frequency of the pulse-width modulated signal is twice the frequency of the master oscillator signal. Thus, for an output frequency of 20 kilohertz, a master oscillator frequency of 10 kilohertz is required.

It will be seen that, whilst each of the servo loops is totally independent as far as concerns their individual control, the basic frequency of the pulse-width modulated signals which drive the individual output transistors are all controlled from a single source—the master oscillator. The oscillator frequency and phase remain the same for all the IC's independently of the pulse duration required for each servo loop.

Figure 8:
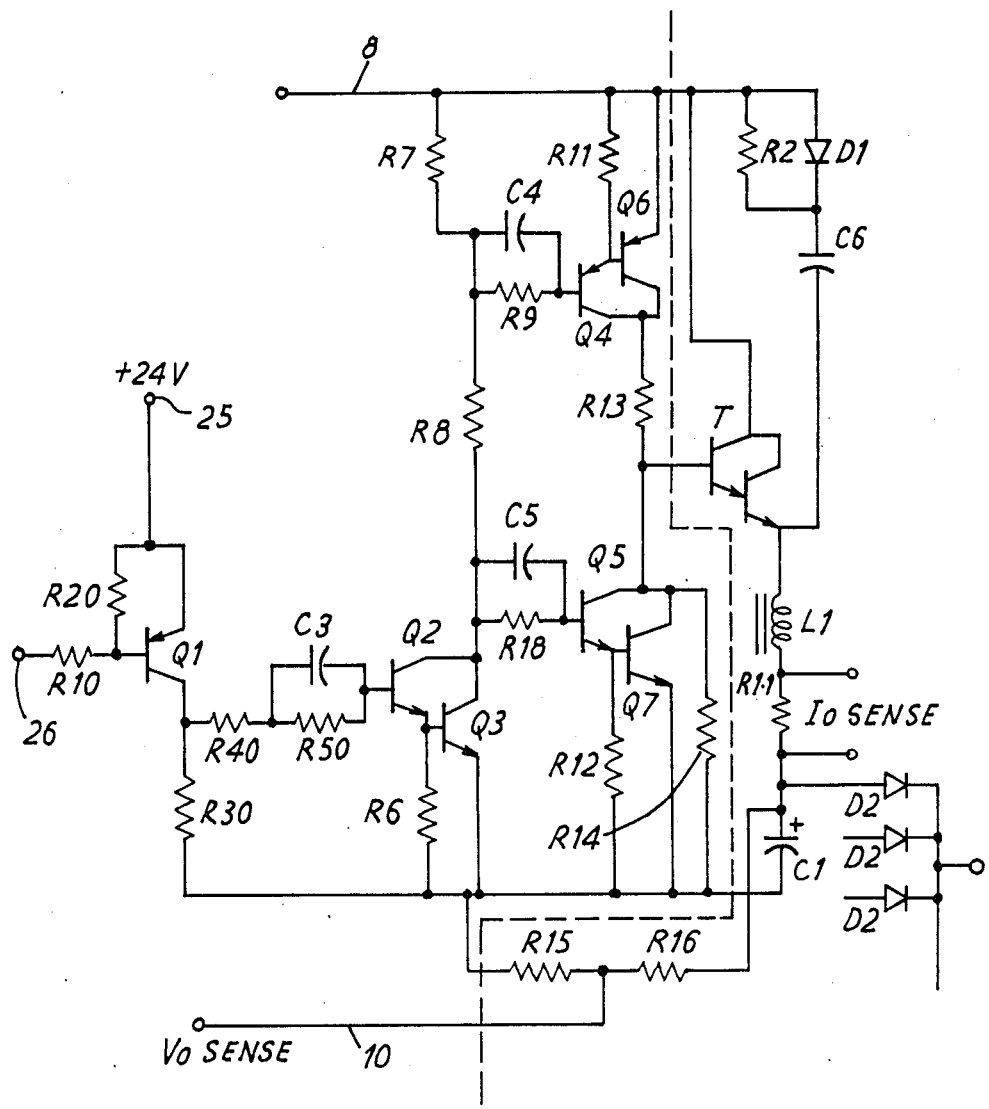
FIG. 8 is a circuit diagram of a drive and output circuit suitable for use in the servo loop of FIG. 7.
Figure 9:
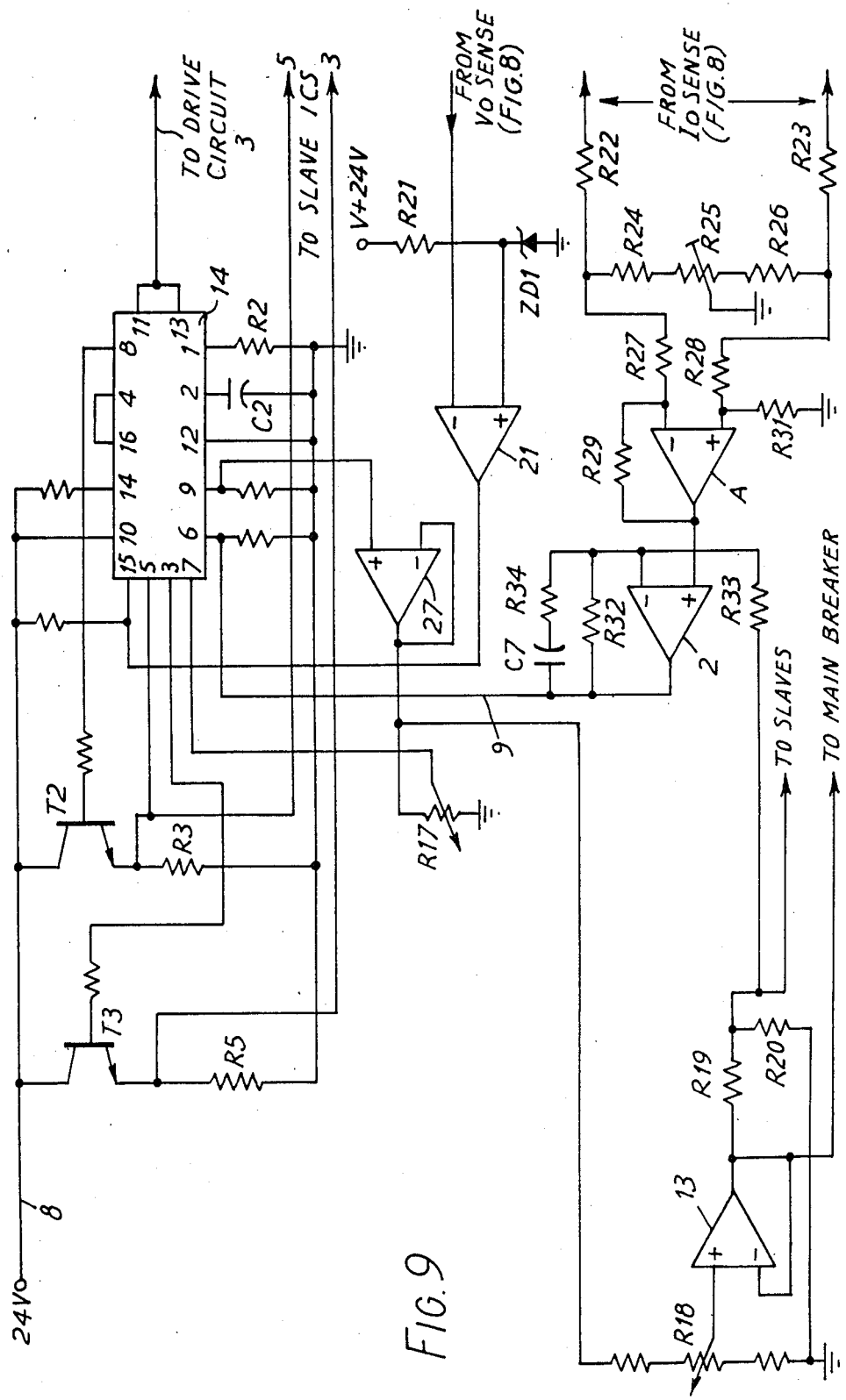
FIG. 9 is a circuit diagram of the control circuit used in the servo loop of FIG. 7.

FIGS. 8 and 9 show respectively a typical drive and output circuit, and a control circuit and are, for the most part, self-explanatory. In each case, the circuit diagrams show circuit details which have been shown in outline previously and, where appropriate, the same reference numerals are given. The drive circuit shown in FIG. 8 performs two main functions as follows:

1. It translates the output voltage level of the associated master/slave IC to the voltage level used by the associated output semiconductor and, 2. It brings the output drive current to a level sufficient to saturate the output semiconductor when the latter is turned "ON" and to completely turn it "OFF" when required to do so. It has to perform these two functions within a few microseconds, this speed being necessary in order to minimise the power dissipation of the output semiconductors. The output drive circuit configuration will vary greatly with the type of output semiconductor used and with the load current level at which it is controlled.

The output semiconductors may be any one of the following types:
1. PNP power transistor
2. NPN power transistor
3. Power MOSFET(s)

Referring to FIG. 8, it will be noted that the output circuit is located to the right of the dotted line while the final drive circuit is located to the left.

The first stage (transistor Q1 and associated components) is fed by a 24 volts regulated power source (not shown) applied at terminal 25 while the rest of the final drive circuit and the output circuit are fed by the 40 volts unregulated high current source on line 8.

The input signal at terminal 26 is provided by commoned pins 11 and 13 of IC14/15. There exists two possible states for the input signal, that is, either high (24 volts DC) or low (ground). The output stage is in the OFF state when the input signal is high, and ON when the input signal is low.

The input signal is applied to the base of a transistor Q1 via a base resistor R10. Base bias for transistor Q1 is provided by a resistor R20 connected to the terminal 25. The transistor is biassed in such a way that, whenever the input signal is high, the transistor is switched OFF and the junction of transistor Q1 collector, and resistors R30 and R40 is at ground potential. The output from transistor Q1 is taken via resistor R40 to a darlington pair comprising transistors Q2 and Q3 which latter are also switched OFF at this time so that the junction of transistor Q2, Q3 collectors and resistors R8 and R18 and capacitor C3 is at a sufficiently high potential to drive the transistors Q5 and Q7 ON. The junction of transistor Q5, Q7 collectors and R13 and R14 is therefore close to ground potential and the output transistor T is thus turned OFF. A small current is arranged to flow through resistors R7, R8 and R10, together with the base-emitter junctions of transistors Q5 and Q7. This small current causes a voltage drop at the junction of resistors R7, R8 and R9 and capacitor C4; however, this voltage drop is insufficient to cause transistors Q4 and Q6 to turn ON. A 1.2 volts difference has to be measured between that particular junction and the line 8 in order that transistors Q4 and Q6 are turned ON.

When the input signal reverts to a low state, transistor Q1 is turned ON and the 24 volts supply appears at the junction of the collector of transistor Q1 with resistors R30 and R40 and current flows through resistors R40 and R50 and transistors Q2 and Q3 are thus turned ON. Capacitors C3, C4 and C5 are speed-up capacitors. Their function is to minimise turn-on, and turn-off delays in the transistors. The current flow through resistors R7 and R8 is greatly increased as the collectors of transistors Q2 and Q3 are brought to common line potential. Transistors Q5 and Q7 are turned OFF and transistors Q4 and Q6 are turned ON. Moderately high current flows through transistor Q6, resistor R13 and the base-emitter junction of output transistor T cause it (transistor T) to turn ON. A voltage divider consisting of resistors R13 and R14 limits the base current of output transistor T to a safe level. Resistors R6, R11 and R12 provide a path for the base-emitter current carriers of their respective transistors (Q3, Q6 and Q7) to flow when these transistors are turned OFF and also help speed up the turn-off process.

The functioning of the output circuit is described above and will not be repeated. It will be noted that the loop current sensor (resistor R1.1) is positioned in the filter network between the choke coil L1 and the filter capacitor C1. The main reason for this lies in the particular application envisaged for the present circuit, which is electric arc welding.

In welding applications, whenever the welder lifts his welding torch from the workpiece, the welding current is suddenly interrupted and the output voltage starts to rise. Capacitor C1 continues to draw current until such time as it is charged up to some value situated somewhere below the power source potential. This charging-up current is also limited to a safe value by the loop current sensing circuit. When the desired voltage is attained, the output circuitry is turned OFF. The desired voltage is of sufficient amplitude to cause a very high discharge current when the welding process is resumed. This high current eases the welding arc starting process. The desired voltage is sensed at the junction of resistors R15 and R16 and used to turn off the IC14/15, as described in detail above.

The circuitry shown in FIG. 9 has been mainly covered before and the use of existing reference numerals will aid clarity. It will be noted that the IC14 shown in the drawing is the *master* IC and FIG. 9 therefore shows a section of the *first* servo-loop, the remaining servo loops using the slave IC's (not shown in FIG. 9) to generate the pulse-width modulated drive signal to be applied to their respective drive circuit 3.

A voltage follower amplifier 27 has its inverting input connected to its output and its non-inverting input connected to pin 9 of IC14. In this way, the reference voltage generated at pin 9 of IC14 is available at a much lower impedance at the output of amplifier 27. This may then be used as a reference source through an adjustable resistor R17 in order to apply variable voltage to pin 7 of IC14 in order to set the maximum ON time of the output transistor T. The output of amplifier 27 is also connected to variable resistor R18 which is the output current reference point applied to buffer amplifier 13. The output from buffer 13 is applied to a voltage divider comprising resistors R19 and R20. The tapped-off voltage is used as a reference setting, as described above.

Amplifier 21 acts as a comparator to compare a reference voltage set up by resistor R21 and zener diode ZD1 with the output from the voltage divider R15, R16 in the output circuit. Whenever the output sensed voltage exceeds the reference signal the output of amplifier 21 switches from a high level to a low level, this output signal being in turn applied to pin 15 of IC14 to turn the IC OFF.

The loop output current is sensed by the shunt resistor R1.1, as shown in FIG. 8. Resistors R22, R23, R24, R25 and R26 are connected across resistor R1.1 to provide a fully differential input circuit for amplifier A. The differential input circuit is required since the point at which R1.1 samples the current is at a fairly high potential. This high voltage becomes common mode to the amplifier A and is thus not amplified. Only the difference of voltage caused by the loop output current through resistor R1.1 is amplified and is thus truly representative of the output current. Resistors R27, R28, R29 and R31 set the gain of amplifier A. The output of the amplifier is applied to the non-inverting input of amplifier 2. Resistors R32 and R33 determine the gain of amplifier 2. Resistor R34 and capacitor C7 form an integrator which slows down the response the amplifier 2. The output of amplifier 2 is applied to pin 6 of IC14, as described above.

The use of the above-described apparatus enables the purchasing of output semiconductor devices to be simplified such that such devices can be purchased as standard items without the troublesome and expensive selection that is otherwise necessary. Standard devices can be installed in the multiple parallel servo system. The quality of the control and the life of the transistor devices will be greatly improved. Output voltage and current drifts experienced with other systems are eliminated. The above-described apparatus also eliminates the necessity for the parameters of the transistor devices to remain constant throughout their lifetime.

The frequency of the pulse generators is typically between 10 kHz and 25 kHz which is higher than the frequencies used in known devices. The use of higher switching frequencies allows the use of smaller passive components such as coils and capacitors while retaining the same quality of output voltage and current (% ripple) and results in less overall heat dissipation and minimal cooling difficulties.

The apparatus can readily handle high power loads requiring current well in excess of 100 A.

I claim:

1. Electrical power control apparatus comprising a plurality of power transistors connected in such a way as to share the total current between a power source and a load, each of said power transistors being connected in a separate servo loop operable to separately regulate the current supplied by each transistor, each servo loop comprising means for generating a control signal indicative of the current supplied by its associated transistor, comparator means for comparing said control signal with a current reference signal to generate an error signal, a pulse generator connected to receive said error signal and operable to generate a pulse width modulated drive signal whose mark/space ratio is dependent upon said error signal, and means for applying said drive signal to its respective power transistor so that said drive signal controls the current supplied by its respective transistor in such a way that each servo loop regulates its own output current, and wherein means are provided for electrically connecting the several power transistors in such a way that the sum of the individual loop output currents flows through the load.

2. Electrical power control apparatus as claimed in claim 1 further comprising means for synchronising the operation of said pulse generators in such a way that the turn ON times of each of the power transistors are synchronised, the respective turn OFF times being under the control of the respective drive signal.

3. Electrical power control apparatus as claimed in claim 2 wherein all of said pulse generators are synchronised with a common master oscillator.

4. Electrical power control apparatus as claimed in claim 1 wherein each said servo loop operates in a non-linear mode and wherein said power transistors are each controlled in a switching mode by their respective pulse-width modulated drive signal.

5. Electrical power control apparatus as claimed in claim 1 further comprising a reference source operable to provide said current reference signal.

6. Electrical power control apparatus as claimed in claim 5 wherein said reference source is adjustable so as to enable the power supplied by the transistors to be adjustable.

7. Electrical power control apparatus as claimed in claim 1 further comprising means for monitoring the sum of the currents of the individual power transistors and means for inhibiting operation of the pulse generators in the event that the sum exceeds a predetermined limit.

8. Electrical power control apparatus as claimed in claim 1 further comprising means for monitoring the voltage applied to the load and means for inhibiting the operation of the pulse generators in the event that the voltage exceeds a predetermined limit.

9. Electrical power control apparatus as claimed in claim 2 wherein each said servo loop operates in a non-linear mode and wherein said power transistors are each controlled in a switching mode by their respective pulse-width modulated drive signal.

10. Electrical power control apparatus as claimed in claim 3 wherein each said servo loop operates in a non-linear mode and wherein said power transistors are each controlled in a switching mode by their respective pulse-width modulated drive signal.

* * * * *